(12) United States Patent
Albrecht (10) Patent No.: US 10,367,792 B2
(45) Date of Patent: Jul. 30, 2019

(54) END-TO END ENCRYPTION FOR PERSONAL COMMUNICATION NODES

(71) Applicant: Orion Labs, San Francisco, CA (US)

(72) Inventor: Greg Albrecht, San Francisco, CA (US)

(73) Assignee: Orion Labs, San Francisco, CA (US)

(*) Notice: Subject to any disclaimer, the term of this patent is extended or adjusted under 35 U.S.C. 154(b) by 173 days.

(21) Appl. No.: 15/437,661

(22) Filed: Feb. 21, 2017

(65) Prior Publication Data

US 2018/0063094 A1     Mar. 1, 2018

Related U.S. Application Data

(60) Provisional application No. 62/379,442, filed on Aug. 25, 2016.

(51) Int. Cl.
| | |
|---|---|
| *H04L 9/32* | (2006.01) |
| *H04L 29/06* | (2006.01) |
| *H04L 9/06* | (2006.01) |
| *H04L 9/08* | (2006.01) |

(52) U.S. Cl.
CPC ........ *H04L 63/0435* (2013.01); *H04L 9/0637* (2013.01); *H04L 9/0643* (2013.01); *H04L 9/0822* (2013.01); *H04L 9/0833* (2013.01)

(58) Field of Classification Search
CPC . H04L 63/0435; H04L 9/0637; H04L 9/0643; H04L 9/0822; H04L 9/0861; H04L 9/3242; H04N 19/105; H04N 19/172; H04N 19/176; H04N 19/182; H04N 19/46; H04N 19/513; H04N 19/523; H04W 88/02

USPC ......... 380/270, 281; 713/151, 153, 168, 189
See application file for complete search history.

(56) References Cited

U.S. PATENT DOCUMENTS

| | | | | |
|---|---|---|---|---|
| 7,234,063 | B1* | 6/2007 | Baugher ............... | H04L 9/0833 380/259 |
| 2003/0081789 | A1* | 5/2003 | Numao .................. | H04L 9/085 380/278 |
| 2003/0133575 | A1* | 7/2003 | Challener ............... | G06F 21/57 380/277 |

(Continued)

OTHER PUBLICATIONS

"WhatsApp Encryption Overview," Technical white paper, Apr. 4, 2016, 9 pgs. (www.whatsapp.com/security).

*Primary Examiner* — Gary S Gracia (57) ABSTRACT

Systems, methods, software and apparatus enable end-to-end encryption of group communications by implementing a pairwise encryption process between a pair of end user devices that are members of a communication group. One end user device in the pairwise encryption process shares a group key with the paired end user device by encrypting the group key using a message key established using the pairwise encryption process. The group key is shared among group members using the pairwise process. When a transmitting member of the group communicates with members, the transmitting member generates a stream key, encrypts stream data using the stream key, encrypts the stream key with the group key, then transmits the encrypted stream key and encrypted stream data to group members. The group key can be updated through the pairwise encryption process. A new stream key can be generated for each transmission of streaming data such as voice communications.

20 Claims, 4 Drawing Sheets

(56) References Cited

U.S. PATENT DOCUMENTS

| | | | |
|---|---|---|---|
| 2006/0179478 A1* | 8/2006 | Han | H04L 9/0822 726/5 |
| 2007/0061569 A1* | 3/2007 | Lee | H04L 9/0833 713/163 |
| 2007/0150720 A1* | 6/2007 | Oh | H04L 63/065 713/153 |
| 2007/0223706 A1* | 9/2007 | Gantman | H04L 9/085 380/286 |
| 2008/0013733 A1* | 1/2008 | Johansson | H04L 9/0836 380/278 |
| 2008/0112363 A1* | 5/2008 | Rahman | H04W 8/005 370/331 |
| 2009/0167535 A1* | 7/2009 | Sanchez | H04L 9/0825 340/573.1 |
| 2009/0323969 A1* | 12/2009 | Nishi | H04J 13/00 380/281 |
| 2011/0142241 A1* | 6/2011 | Goto | H04W 12/04 380/279 |
| 2012/0008783 A1* | 1/2012 | Montenegro | H04L 63/065 380/270 |
| 2013/0036305 A1* | 2/2013 | Yadav | H04L 63/065 713/168 |
| 2013/0263223 A1* | 10/2013 | Cherian | H04L 9/0869 726/4 |
| 2016/0080416 A1* | 3/2016 | Purohit | H04L 12/189 713/151 |
| 2016/0135045 A1* | 5/2016 | Lee | H04W 12/06 726/9 |

* cited by examiner

END-TO END ENCRYPTION FOR PERSONAL COMMUNICATION NODES

RELATED APPLICATIONS

This application claims the benefit of, and priority to, U.S. Provisional Patent Application No. 62/379,442, entitled "END-TO-END ENCRYPTION FOR GROUP COMMUNICATION DEVICES", filed Aug. 25, 2016, and which is hereby incorporated by reference in its entirety for all purposes.

TECHNICAL FIELD

Aspects of the disclosure are related to communications and, in particular, to establishing and providing end-to-end encryption of one-to-many group communications.

TECHNICAL BACKGROUND

Telephones, computers, and tablets provide an efficient way for users to communicate without being in the same physical location. In many situations the end users of a group communication system wish to maintain their communications in secret, including preventing a network operator or other administrator or the like from having access to the members' communications. Some wearable end user devices (i.e., communication devices) allow individual users to form and communicate with groups of any size using a companion intermediate communication device (e.g., a smartphone application), where group and user administrative tasks, as well as signaling and media transport can be provided by a group communication server or the like. Some encryption protocols prevent third parties from having plaintext access to users' communications and, further, prevent use of compromised encryption keys to go back in time to decrypt previously-transmitted communications. However, these strong encryption protocols require updating message keys with each message transmitted and are unsuitable for streaming communications. As a result, it would be advantageous to facilitate well-protected streaming communications in a group communication setting.

OVERVIEW

Implementations of end-to-end encryption of streaming group communications include lightweight encryption of communications where a multiple-party session is established using a pairwise public key encryption process established and executed between pairs of end user devices, followed by generation, encryption and distribution of a symmetric group key used to encrypt communications distributed to communication group members using server-side fan-out for group messages or the like to distribute encrypted streaming communications such as voice communications.

Systems, methods, software and apparatus enable end-to-end encryption of group communications by establishing strong message encryption keys using a pairwise encryption process (e.g., establishing a root key, one or more chain keys based on the root key, and at least one message key based on one of the chain keys) performed by a pair of end user devices that are part of a communication group that can include a number of end user devices (i.e., endpoints). One of the pair of end user devices in the pairwise encryption process shares a group key with the other end user device in the pair by encrypting the group key using a message key.

The group key is thus shared among all members of the communication group using the pairwise process. When a transmitting member of the communication group wants to communicate with other members, the transmitting member generates a stream key, encrypts stream data using the stream key, encrypts the stream key with the distributed group key, and then transmits the encrypted stream key and encrypted stream data to the other group members (e.g., using a server-side fan-out distribution process). The group key can be updated as desired by updating the pairwise encryption process to generate new message keys that encrypt new group keys for distribution to the group members. Moreover, a new stream key can be generated by each group member when transmitting streaming data (e.g., voice communications) to other group members.

This Overview is provided to introduce a selection of concepts in a simplified form that are further described below in the Technical Disclosure. It may be understood that this Overview is not intended to identify or emphasize key features or essential features of the claimed subject matter, nor is it intended to be used to limit the scope of the claimed subject matter.

DETAILED DESCRIPTION

Personal communication devices (e.g., cellphones, smartphones, gaming devices, personal computers, tablet computers) can be used to communicate with other devices, including in situations where a group of individual devices communicate with one another in one-to-many near-real-time streaming communications using a common media transport system. In many instances confidential communication among such group members is desired. While many encryption and other security systems have been created for protection of in-transit data, many of these are too cumbersome or generate excessive latency problems if use in connection with streaming communications (e.g., voice communications).

Implementations of end-to-end encryption of streaming group communications provide confidentiality for a one-to-many near-real-time streaming media transport system. In such implementations, a transmitter (i.e., a transmitting end user communication device) and one or more receivers (i.e., receiving end user communication devices) employ Identity Keys, Signed Pre Keys, and One-Time Pre Keys to establish pairwise encrypted one-to-one sessions. These encrypted one-to-one sessions are used to establish and distribute Group Keys for encrypting Stream Keys and streaming media content (e.g., voice communications) that are transmitted in a one-to-several (e.g., server-side fan-out) process. Each end user communication device (acting as a transmitter and/or receiver) is considered an endpoint. The system also can include a network service providing signaling and media transport, as well as one or more smartphones or other intermediate communication devices that provide communications between the endpoints and the network.

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Some implementations of end-to-end encryption of streaming group communication are utilized in communication systems that allow communication nodes including a wearable group communication end user devices to communicate with one another via their respective intermediate communication devices and a communication network (e.g., a wearable personal communication device wirelessly linked to the intermediate communication device). Such systems connect each end user device to an associated intermediate communication device, which in turn is connected to a network that then enables communications between and among members of a group that is made up of multiple end user devices.

Earlier encryption functionalities in communication systems have utilized systems that decrypted communications (or, at least, permitted such decryption) at one or more points between endpoints (i.e., end users) and/or have given access to plaintext user communications in other ways. Implementations of end-to-end encryption of streaming group communication disclosed and claimed herein permit end users to communicate using encrypted communications while maintaining complete possession and control of the private keys and other security data. These features are implemented in systems and the like that can provide confidentiality for a one-to-many, near-real-time streaming media transport system that can permit, for example, encrypted voice communications among end users. In some implementations a transmitter and one or more receivers use various public/private key pairs to establish one-to-one (i.e., pairwise) encryption sessions. These encrypted pairwise sessions are then used as the basis for establishing and distributing additional keys for encrypting streaming media content and the like. Each end user device is considered an endpoint in such systems, which can also include a network service (e.g., that provides signaling and media transport) and an intermediate communication device (e.g., smartphones, computers, tablets, other computing systems) that enable communications between the network and the endpoints. Implementations of end-to-end encryption of streaming group communications utilize highly secure encryption without the delays inherent in earlier systems, making implementations herein suitable for voice communication encryption, streaming data encryption, and the like.

Figure 1:
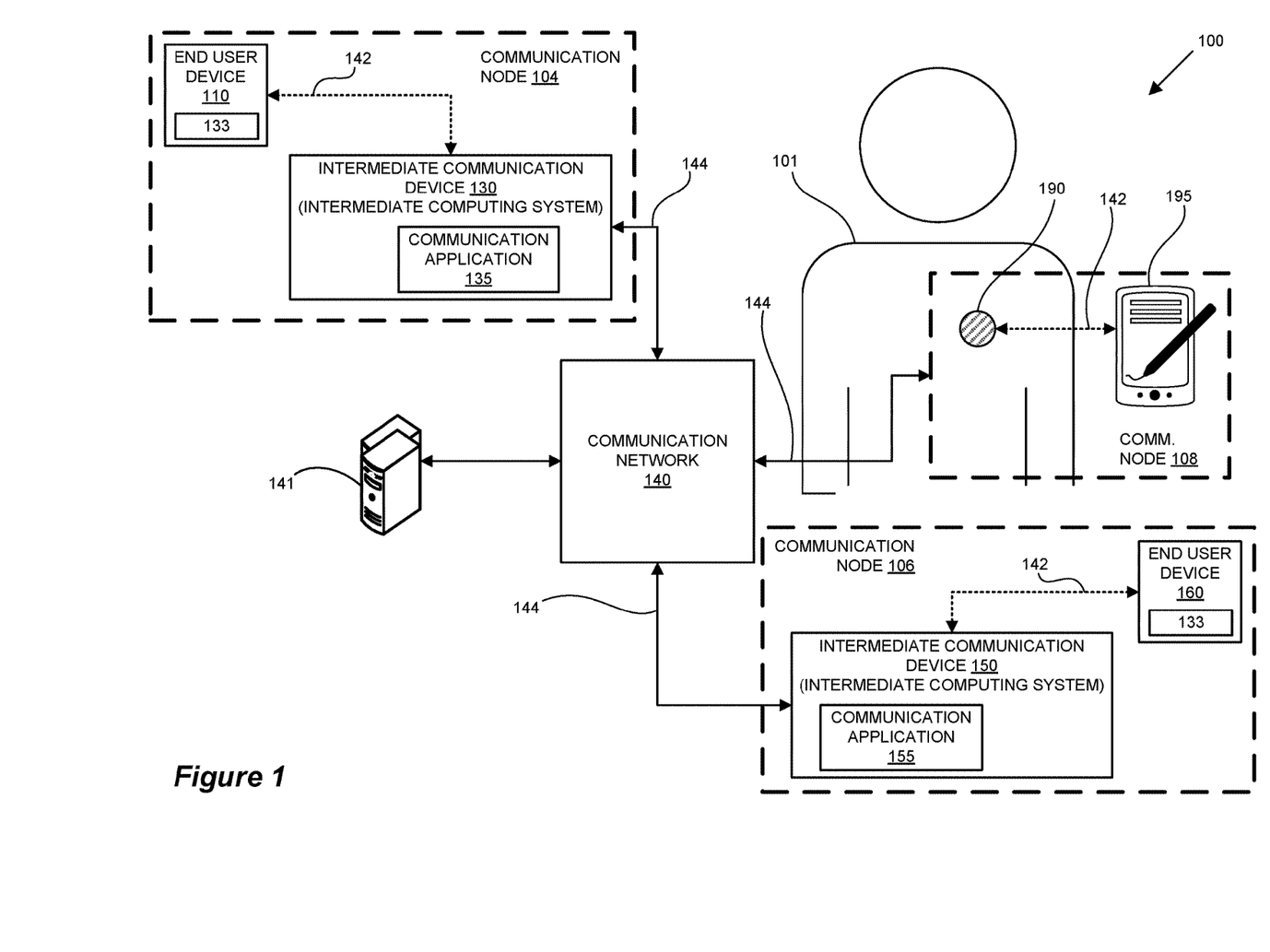
FIG. 1 illustrates a system and operation of personal communication nodes implementing end-to-end encryption of streaming group communications.

FIG. 1 illustrates one or more implementations of a communication system 100 configured to facilitate, among other things, audio communications between endpoint devices on a communications network. System 100 includes communication node 104 (which includes endpoint end user device 110 and intermediate communication device 130 (also referred to as an intermediate computing system)), communication node 106 (which includes endpoint end user device 160 and intermediate communication device 150 (also referred to as an intermediate computing system)), and communication network 140 linking nodes 104, 106. An additional communication node 108 (associated with a user 101), comprising an end user device 190 coupled to an intermediate communication device 195, also is shown connected to network 140. As will be appreciated by those skilled in the art, additional nodes, endpoint devices, end user devices and intermediate communication devices can be interconnected via communication network 140. The endpoint devices 110, 160, 190 can each be a highly portable (e.g., wearable) communication device.

Intermediate communication device 130 (also referred to as an "ICD," which can be a computing system such as a cellphone, smartphone, tablet or laptop) in communication node 104 communicates with its associated end user device 110 over a communication link 142 (e.g., Bluetooth or Bluetooth low energy), and further communicates outside node 104 using communication network 140 over one or more communication network links 144. ICD 150 (which can be a computing system such as a cellphone, smartphone, tablet or laptop) in communication node 106 also communicates with its associated end user device 160 using a communication link 142, and further communicates outside node 106 using communication network 140 over communication network link 144. ICD 195 (which can be a computing system such as a cellphone, smartphone, tablet or laptop) in communication node 108 also communicates with its associated end user device 190 using a communication link 142, and further communicates outside node 108 using communication network 140 over communication network link 144.

Links 142 can be used to link an end user device with its associated intermediate communication device using communication linking. The communication link 144 that connects intermediate communication device 130 to communication network 140 can use one or more of Time Division Multiplexing (TDM), asynchronous transfer mode (ATM), IP, Ethernet, synchronous optical networking (SONET), hybrid fiber-coax (HFC), circuit-switched, communication signaling, wireless communications, or some other communication format, including improvements thereof. Links 144 connecting intermediate communication devices 150, 195 to network 140 operate similarly. Communication links 144 each use metal, glass, optical, air, space, or some other material as the transport media and may each be a direct link, or can include intermediate networks, systems (including one or more management service systems), or devices, and can include a logical network link transported over multiple physical links.

Each ICD 130, 150, 195 may comprise a smartphone, tablet, computer, or some other computing system capable of running a communication application and communicating with communications network 140 using the Internet or some other widespread communication network. Moreover, communications network 140 can include management and/or other group communication services (e.g., via a computing system comprising one or more servers 141 or the like), including those described below in connection with various implementations of end-to-end encryption of streaming group communication. Each of ICDs 130, 150, 195 includes at least one user interface that allows a user to enter data and interact with a communication application (e.g., applications 135, 155 operating on ICDs 130, 150, respectively). ICD 195 operates similarly, though its communication application is not shown in FIG. 1. When transmitting and receiving data, ICDs 130, 150, 195 and the like can use an appropriate data transfer scheme.

As noted above, communications network 140 can comprise a server system 141 utilizing one or more computing devices capable of providing communication services to a plurality of communication nodes and their respective endpoint devices, such as end user devices 110, 160, 190. End user devices 110, 160, 190 (also referred to as "EUDs") may each comprise a speaker, microphone, processing system, communication interface, and a user interface to exchange communications with ICDs 130, 150, 195, respectively, and thus with communications network 140 and other endpoint devices of various types. In implementations of end-to-end encryption of streaming group communication, EUDs 110, 160, 190 may each also include an encryption module 133 configured to encrypt communication data before it is transmitted to another EUD via the sending EUD's associated ICD.

Figure 2:
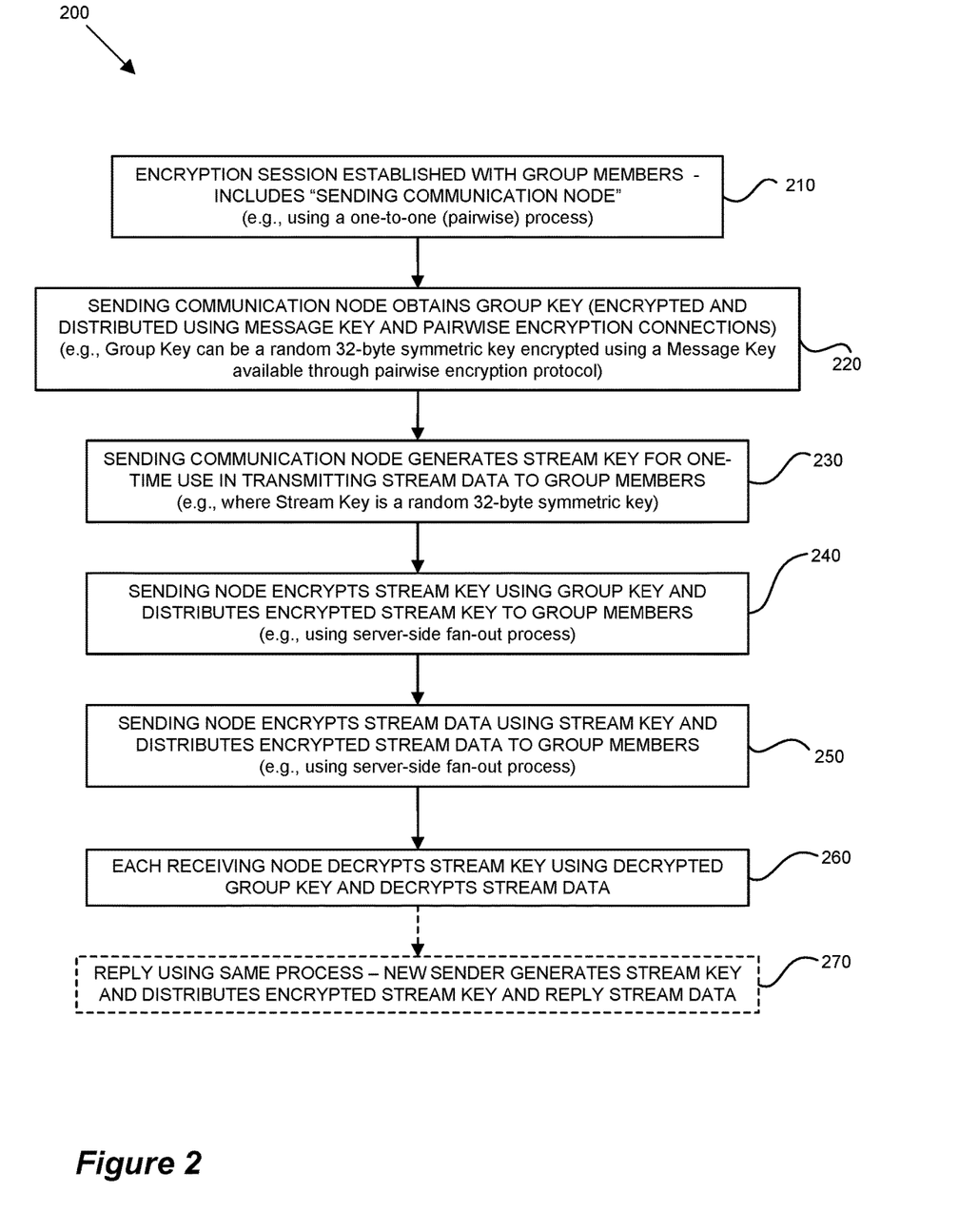
FIG. 2 illustrates a method for providing end-to-end encryption of streaming group communications.

Exemplary operation of end-to-end encryption of streaming group communication is illustrated in FIG. 2, though at least some of these and/or other steps could be performed in other ways in various implementations. In the non-limiting example illustrated FIG. 2, which uses components similar to those of FIG. 1, each group member (e.g., a group comprising endpoint end user devices 110, 160, 190) is an endpoint in a group communication system providing end-to-end encryption of streaming group communications.

FIG. 2 illustrates one non-limiting exemplary method 200 of the operation of a sending node (i.e., a personal communication node implementing end-to-end encryption to send stream data via group communications). Initially, an encryption session is established (210). This can be done using one of a variety of techniques, including using the one-to-one, pairwise session techniques disclosed herein. Once the encryption session is established, the sending node obtains a Group Key (e.g., by generating the Group Key or receiving it from another group communication node) that is or has been distributed to the nodes that are connected via the encryption session (220). The Group Key (e.g., a random 32-byte symmetric key) can be generated by the sending node or can be received from another group node that has generated the Group Key. The sending node generates a Stream Key (230), which can be an ephemeral random 32-byte symmetric key. The sending node encrypts the Stream Key using the Group Key and distributes the encrypted Stream Key to the group members (240), for example using a server-side fan-out process in some implementations. Finally, the sending node uses the Stream Key to encrypt stream data (e.g., streaming voice data) and sends that encrypted stream data to the group members (250), for example using a server-side fan-out process again. Each receiver node in the group receives and decrypts the Stream Key using the previously-distributed and decrypted Group Key and utilizes the Stream Key to decrypt the sender's streaming message data (260). If a second communication node wishes to reply, that second sending node member generates its own ephemeral Stream Key, encrypts the new Stream Key using the Group Key, and sends the encrypted new Stream Key along with the reply stream data (270).

In some implementations a process similar to the Signal Protocol process developed by Open Whisper Systems and/or Secret Conversations process implemented by Facebook can be used to establish encryption sessions that permit the cryptographically protected distribution of a Group Key to communication nodes that are members of a communication group. In such an encryption session formation process, one non-limiting example of which is shown as process 300 in FIG. 3, an "initiator" establishes a pairwise (one-to-one) session with one or more additional nodes ("responders"), utilizing several key pairs. Using EUD 110 as the initiator and EUD 160 as one of the responders, at initial start-up of each end user device (e.g., when the end user device is powered on initially), each end user device in the communication node group 302 generates and stores (step A) an Identity Key Pair, a Signed Pre Key Pair and multiple One-Time Pre Key Pairs (e.g., storing the keys in on-chip SRAM that is accessible only from on-board trusted computing firmware). Generating the Identity Key Pair can be a one-time event (e.g., performed only at the initial EUD start-up and/or after zeroization of the Identity Key Pair). In some implementations the Identity Key Pair can be a long-term Curve25519 Elliptic curve Diffie-Hellman (ECDH) key pair, generated at initial startup using a 256-bit Initial Vector (IV) from a Cryptographically Secure Pseudo-Random Number Generator (CSPRNG). Likewise, in some implementations the Signed Pre Key pair can be a medium-term Curve25519 ECDH key pair, generated at initial startup using a 256-bit IV from a CSPRNG, signed by the Identity Key, and rotated on a periodic timed basis. Finally, the One-Time Pre Key pairs can be a queue of Curve25519 ECDH key pairs for one time use, generated at initial startup using a 256-bit IV from a CSPRNG, and replenished as needed. The keys used in the encryption session establishment phase can, like some implementations of the Signal Protocol, be 32-byte root keys, 32-byte chain keys generated from the root keys, and 80-byte message keys used to encrypt message contents (e.g., the Group Key), where 32 bytes are used for an AES-256 key, 32 bytes for an HMAC-SHA256 key, and 16 bytes for an IV.

Such implementations can provide confidentiality for a one-to-many, near-real-time streaming media transport system in which a transmitter and one or several receiver(s) use the Identity Keys, Signed Pre Keys, and One-Time Pre Keys to establish encrypted one-to-one sessions. In addition to these encrypted one-to-one sessions, the disclosed Group Keys and Stream Keys can be used for encrypting streaming media content. Collectively the end user devices are endpoints and the system also includes a network service that provides signaling and media transport, and intermediate communication devices (e.g., smartphones) that provide communications and other processing between the endpoints and the network.

Figure 3:
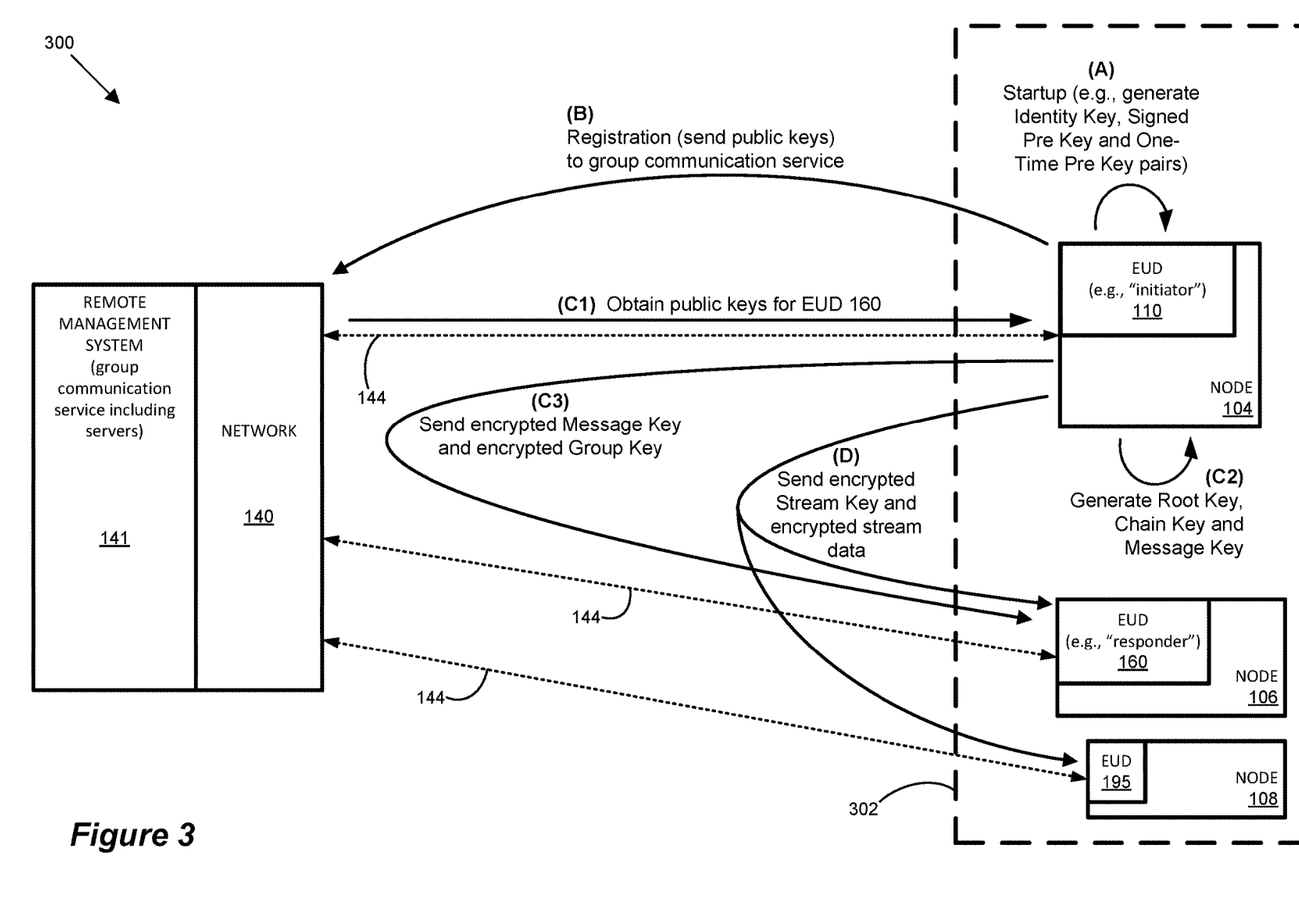
FIG. 3 illustrates a system and operation of personal communication nodes implementing end-to-end encryption of streaming group communications.

Initiating end user device 110 can then register (step B) for end-to-end encryption of one-to-several communications within group 302. In some implementations registration is performed by each end user device (i.e., endpoint device) sending its public Identity Key, its public Signed Pre Key (with its signature), and a batch of public One-Time Pre Keys to a remote management system 141 that can include a group communication service, which can be linked to a remote management system 141 (e.g., via communication network 140 and links 144), which stores these keys and associates them with an identifier for each end user device. At no time does system 141 receive or have access to any end user's private keys in such implementations.

After two or more end user devices of communication group 302 have registered (e.g., by storing their respective public keys with system 141), an end user device 110 can initiate and establish an encrypted communication session (one non-limiting example of establishing an encrypted communication session is shown in steps C1-C3) with each communication node member of group 302. Once an encryption session is established, cryptographically connected end user devices do not need to rebuild a new session until an initialized session is terminated (e.g., through an external event such as zeroization, or in some implementations whenever an end user device leaves the group and is no longer a group member). In some implementations a single end user device is the initiator (i.e., the only initiating device that establishes the encryption session), while in other implementations multiple end user devices that are part of group 302 can serve as initiators (establishing encryption links with other group members) and ensure distribution of the Group Key used for group (i.e., one-to-several) communication of streaming data and the like.

To establish an encryption session for group 302 in the exemplary process and system of FIG. 3, initiator end user device 110 obtains (step C1) the public Identity Key (IKpk (R)), public Signed Pre Key (SPKpk(R)) and a single public One-Time Pre Key (OTPKpk(R)) corresponding to a first responder end user device 160 (e.g., by requesting the public keys from system 141, which obtains and stores all group members' public keys as a result of end user device registration). A given One-Time Pre Key is used only once and is then removed from server 141 storage after being requested. If all stored One-Time Pre Keys have been used and have not been replenished (e.g., by the recipient sending a new batch), then no One-Time Pre Key is returned.

Initiator 110 saves the responder 160's public keys and then generates an ephemeral key pair (e.g., an ephemeral Curve25519 key pair including initiator's public ephemeral key EKpk (I), and initiator's secret ephemeral key EKsk(I)). Initiator 110 generates a root key (RK) using the requested responder public keys along with the initiator's secret Identity Key and secret ephemeral key (step C2):

a=ECDH (IKsk(I)‖SPKpk(R)
b=ECDH (EKsk(I)‖IKpk(R)
c=ECDH (EKsk(I)‖SPKpk(R)
d=ECDH (EKsk(I)‖OTPKpk(R)
RK=HKDF (a‖b‖c‖d)

where the final ECDH is omitted when no One-Time Pre Key is available and where HKDF is a hash-based message authentication code key derivation function (an HMAC key derivation function). Chain Keys (CK) can be obtained from the Root Key (as updated from time to time through ratcheting or the like in some implementations). A Message Key (MK) is then obtained from the current Chain Key (e.g., MK=HKDF(CK)). The initiator device 110 sends (step C3) the responder device 160 an encrypted message (e.g., containing the current public ephemeral key and the group streaming data Group Key encrypted using the current MK). The recipient device can compute the RK (using the other parts of the same key pairs used by the initiator to calculate RK) upon receiving the first encrypted message from the initiator device, using the computed RK to compute CK and the current MK and thus decrypt the Group Key for later use.

If new non-streaming messages need to be sent between an initiator and responder, once an encrypted session has been established, the initiator and responder EUDs can exchange messages that are protected with a Message Key (e.g., using AES256 in cypher block chaining (CBC) mode for encryption and HMAC-SHA256 for authentication). The Message Key can be changed (e.g., updated via ratcheting or the like) for each message transmitted and is thus ephemeral. Each time a new Message Key is needed by a message sender (e.g., for a new one-to-one message between pairs of EUDs that are cryptographically connected via the encryption system utilizing a Root Key, Chain Key and Message Key), the new Message Key can be calculated as follows: Message Key=HMAC-SHA256 (Chain Key, 0x01). The Chain Key is then updated as Chain Key=HMAC-SHA256 (Chain Key, 0x02), which causes the Chain Key to ratchet forward and also means that a stored Message Key cannot be used to derive current or past values of the Chain Key. Each time a message is transmitted, an ephemeral public key can be advertised along with it (e.g., an ephemeral Curve25519 public key). Once a response is received, a new Chain Key and Root Key are calculated (e.g., as ephemeral_secret=ECDH (Ephemeral$_{sender}$, Ephemeral$_{recipient}$), and Chain Key, Root Key=HKDF (Root Key, ephemeral_secret)). A chain is only used to send messages from one end user device, so Message Keys are not re-used. Because of the way Message Keys and Chain Keys are calculated, messages can arrive delayed, out of order, or can be lost entirely without any problems.

Thus a number of one-to-one (i.e., pairwise) encryption sessions can be established between members of a communication node group, thus linking all members of the communication group in a cryptographically secure manner. The Message Key(s) calculated for each end user device pair can be used to distribute the Group Key to each group member (step C3). Each Group Key can be a symmetric key (e.g., a random 32-byte key). The Group Key is used by all group members to encrypt ephemeral Stream Keys used for encrypting streaming data.

When a group member wishes to communicate a data stream (e.g., as a "sender" communicating with multiple members of the group), the sender generates a new Stream Key (e.g., a different random 32-byte symmetric key), which is then encrypted using the Group Key to generate ciphertext that is sent (step D) to each group member (e.g., using server-side fan-out distribution). This Stream Key generation process continues for every successive streaming data transmission from any member sending streaming data to the group. The sender can begin transmitting ciphertext (step D) as soon as the Stream Key is established.

Communications between end user devices and their respective intermediate communication devices (e.g., iOS and/or Android devices) can be performed via Bluetooth LE Security Mode 1, Level 3 using authenticated pairing with encryption. Pairing between the end user device and its intermediate communication device can be established using a 16-byte passkey. The link can be encrypted using AES128 in counter with CBC-MAC mode. Communications between each intermediate communication device application and servers for system 141 can be layered with a separate encrypted channel. iOS and Android applications currently use TLS 1.2 with server certificate pinning and the following cipher suites:

TLS_ECDHE_ECDSA_WITH_AES_128_GCM_SHA256
TLS_ECDHE_ECDSA_WITH_AES_256_GCM_SHA384

Using such implementations allows end user devices to protect streaming communications with a less burdensome and less complicated encryption plan than Signal Protocol or the like to provide end-to-end encryption of one-to-several streaming communications so that third parties and the system operator cannot read and/or listen to them and so that communications can only be decrypted by the recipient. The system operator does not have access to any of the users' private keys.

Figure 4:
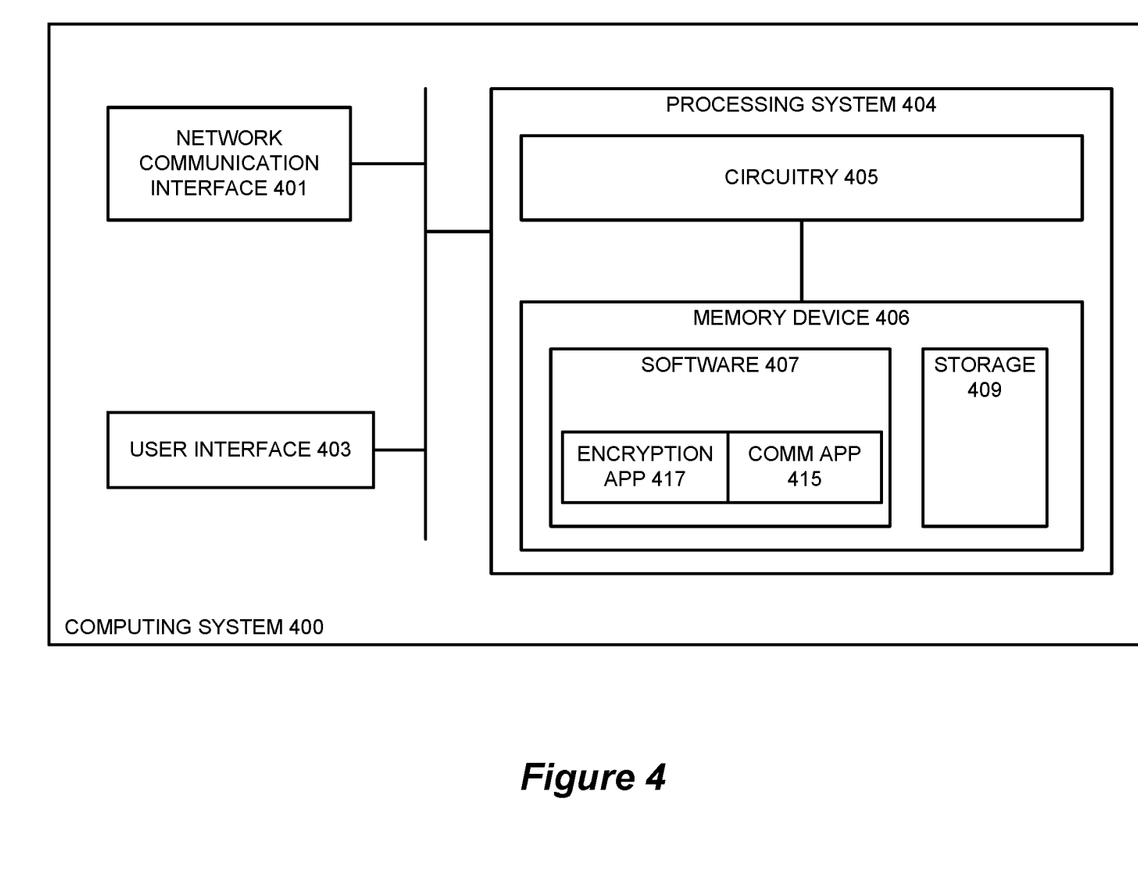
FIG. 4 illustrates a computing system usable in implementing end-to-end encryption of streaming group communications.

FIG. 4 illustrates a computing system 400 to implement the communication systems, devices, apparatus and processes in FIGS. 1-3. Computing system 400 is representative of a computing architecture that may be employed as any computing apparatus, system, or device, or collections thereof (e.g., an end user device such as device 110 or device 160 of FIGS. 1 and/or 3), to suitably implement one or more of the systems, devices, apparatus and processes in FIGS. 1-3. Computing system 400 comprises network communication interface 401, user interface 403, and processing system 404. Processing system 404 is communicatively linked to network communication interface 401 and user interface 403. Processing system 404 includes processing circuitry 405 and memory device 406 that stores operating software 407 (including communication application 415 and encryption application 417, which may be separate or unitary).

Network communication interface 401 comprises components that communicate over network and related communication links (e.g., including those within and extending outside a communication node), such as network cards, ports, RF transceivers, processing circuitry and software, or some other communication devices. Network communication interface 401 may be configured to communicate over metallic, wireless, or optical links and/or also may be configured to use TDM, IP, Ethernet, optical networking, wireless protocols, communication signaling, or some other communication format—including combinations thereof. User interface 403 comprises components that permit user interaction with computing system 400. User interface 403 can include a keyboard, display screen, mouse, touch pad, or some other user input/output apparatus and may be omitted in some examples.

Processing circuitry 405 comprises microprocessor and other circuitry that retrieves and executes operating software 407 from memory device 406. Memory device 406 comprises a non-transitory storage medium, such as a disk drive, flash drive, data storage circuitry, or some other memory apparatus. Operating software 407 comprises computer programs, firmware, or some other form of machine-readable processing instructions. Operating software 407 may include any number of software modules to provide the communication operations described herein. Operating software 407 may further include an operating system, utilities, drivers, network interfaces, applications, or some other type of software. When executed by circuitry 405, operating software 407 directs processing system 404 to operate computing system 400 as described herein to provide end-to-end encryption of streaming group communication. In some implementations the operating software 407 can include a communication application 415 that operates in concert with an encryption application 417 to provide encryption as described herein (in some implementations the communication application 415 and encryption application 417 may be combined into a single application). Additionally, storage 409 may be provided in memory device 406 to provide a location for storage of encryption keys, group member identification data, group communication data and other data used as described in connection with end-to-end encryption of streaming group communication and thus permit computing system 400 to implement key-generating and processing capabilities (e.g., on-chip SRAM for storing keys that can only be accessed by on-board, trusted computing firmware or the like in some implementations) described in connection with various implementations of end-to-end encryption of streaming group communication disclosed herein. Computing system 400 can be implemented in an end user device as described herein so that end-to-end encryption of streaming group communication can be implemented without disclosing private or secret encryption keys to any intermediate devices, parties, etc. Moreover, due to the synergistic use of pairwise encryption for distribution of streaming group keys and stream keys, coupled with the use of one-to-several (e.g., server-side fan-out) distribution of stream data encrypted using stream keys, fast, nimble and secure encryption of voice communication data and other, similar types of encrypted data are realized.

The included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the invention. Those skilled in the art will also appreciate that the features described above may be combined in various ways to form multiple embodiments. As a result, the invention is not limited to the specific embodiments described above, but only by the claims and their equivalents.

What is claimed is:

1. A method for end-to-end encryption of streaming group communications, the method comprising:
    a first end user device obtaining an encrypted group key, wherein the encrypted group key is generated by encrypting an unencrypted group key with a message key, the message key being generated from a chain key, the chain key being generated using a pairwise encryption process implemented by the first end user device and a second end user device
    wherein the first and second end user devices are members of a communication group comprising a plurality of end user devices;
    the first end user device generating an unencrypted first stream key;
    the first end user device encrypting the unencrypted first stream key using the unencrypted group key to generate an encrypted first stream key;
    the first end user device encrypting first stream data using the unencrypted first stream key to generate encrypted first stream data; and
    the first end user device transmitting the encrypted first stream key and the encrypted stream data to the second end user device and at least one other member of the communication group; and
    the first end user device updating the chain key each time a new message key is needed, such that the message key and chain key are ephemeral.

2. The method of claim 1 wherein the first end user device obtains the encrypted group key by one of the following:
    generating the unencrypted group key and encrypting the unencrypted group key using the message key; or
    receiving the encrypted group key from the second end user device and decrypting the encrypted group key using the message key, wherein the second end user device:
    generates the unencrypted group key;
    generates the encrypted group key by encrypting the unencrypted group key using the message key; and
    transmits the encrypted group key to the first end user device.

3. The method of claim 1 wherein the pairwise encryption process implemented by the first and second end user devices comprises using identity key pairs and respective signed pre keys for each of the first and second end user devices to generate a root key, the root key generating the chain key.

4. The method of claim 1 wherein the unencrypted group key comprises a symmetric encryption key.

5. The method of claim 1 wherein each end user device communicates with other members of the communication group using an intermediate communication device.

6. The method of claim 5 wherein each end user device comprises a wearable personal communication device configured to wirelessly communicate with a linked intermediate communication device.

7. The method of claim 5 wherein each intermediate communication device comprises one of the following: a smartphone, a tablet, a cellphone, a laptop computer, a gaming device, or a personal computer.

8. The method of claim 1 further comprising:
the first end user device receiving encrypted second stream data and an encrypted second stream key from a third end user device, wherein the encrypted second stream key comprises an unencrypted stream key encrypted using the unencrypted group key and further wherein the encrypted second stream data comprises unencrypted second stream data encrypted using the unencrypted second stream key; and
decrypting the encrypted second stream data using the unencrypted second stream key.

9. The method of claim 1, wherein a second message key is needed, the chain key is one in a plurality of chain keys, and a new chain key is generated by ratcheting forward one step at a time using the chain key in a cryptographic hash function, such that neither of current and past values of the chain key and the new chain key can be derived.

10. A non-transitory computer readable storage medium having stored thereon program instructions to perform end-to-end encryption of streaming group communications, including instructions, which when executed by one or more processors of a first computing system, cause the first computing system to:
generate an unencrypted first stream key;
encrypt the unencrypted first stream key using an unencrypted group key to generate an encrypted first stream key, wherein an encrypted group key is generated by encrypting the unencrypted group key with a message key, the message key being generated from a chain key, the chain key being generated using a pairwise encryption process implemented by the first computing system and a second computing system, wherein the first and second computing systems are members of a communication group comprising a plurality of end user devices, wherein each end user device in the plurality of end user devices comprises a computing system;
encrypt first stream data using the unencrypted first stream key to generate encrypted first stream data; and
transmit the encrypted first stream key and the encrypted stream data to the plurality of end user devices; and
update the chain key each time a new message key is needed, such that the message key and chain key are ephemeral.

11. The non-transitory computer readable storage medium of claim 10 wherein the pairwise encryption process implemented by the first and second computing systems comprises using identity key pairs and respective signed pre keys for each of the first and second computing systems to generate a root key, the root key generating the chain key.

12. The non-transitory computer readable storage medium of claim 10 wherein the unencrypted group key comprises a symmetric encryption key.

13. The non-transitory computer readable storage medium of claim 10 wherein each end user device communicates with other members of the communication group using an intermediate communication device.

14. The non-transitory computer readable storage medium of claim 13 wherein each end user device comprises a wearable personal communication device configured to wirelessly communicate with a linked intermediate communication device.

15. The non-transitory computer readable storage medium of claim 13 wherein each intermediate communication device comprises one of the following: a smartphone, a tablet, a cellphone, a laptop computer, a gaming device, or a personal computer.

16. The non-transitory computer readable storage medium of claim 10, the chain key is one in a plurality of chain keys, and a new chain key is generated by ratcheting forward one step at a time using the chain key in a cryptographic hash function, such that neither of current and past values of the chain key and the new chain key can be derived.

17. A method for end-to-end encryption of streaming group communications, the method comprising:
generating, at a first end user device a first identity key and a first pre-signed key;
obtaining a second identity key and a second pre signed key from the second end user device, wherein the first and second end user devices are members of a communication group comprising a plurality of end user devices;
generating a root key from the first and second identity keys and the first and second pre-signed keys,
deriving a plurality of chain keys from the root key;
deriving a message key from one of the plurality of chain keys;
obtaining, at the first end user device, an encrypted group key, wherein the encrypted group key is generated by encrypting an unencrypted group key with the message key;
the first end user device generating an unencrypted first stream key, wherein the unencrypted first stream key is a symmetric encryption key;
the first end user device encrypting the unencrypted first stream key using the unencrypted group key to generate an encrypted first stream key;
the first end user device encrypting first stream data using the unencrypted first stream key to generate encrypted first stream data, wherein the first stream data comprises voice communication data; and
the first end user device transmitting the encrypted first stream key and the encrypted stream data to the second end user device and at least one other end user device in the communication group; and
the first end user device updating the chain key each time a new message key is needed, such that the message key and chain key are ephemeral.

18. The method of claim 17 wherein the first end user device obtaining the encrypted group key comprises one of the following:
the first end user device receiving the encrypted group key from the second end user device; or
the first end user device generating the unencrypted group key, encrypting the unencrypted group key, and transmitting the encrypted group key to the second end user device.

19. The method of claim 17 wherein each end user device comprises a wearable communication device.

20. The method of claim 17 wherein each end user device is linked to an intermediate communication device, and further wherein each intermediate communication device is linked to a network linking the one or more end user devices in the communication group.

* * * * *